United States Patent [19]

Suthersan et al.

[11] Patent Number: 5,588,490

[45] Date of Patent: Dec. 31, 1996

[54] METHOD AND SYSTEM TO ACHIEVE TWO DIMENSIONAL AIR SPARGING

[75] Inventors: Suthan S. Suthersan, Yardley, Pa.; Boris Dynkin, Newton; Richard Cushing, Reading, both of Mass.

[73] Assignee: Geraghty & Miller, Inc., Denver, Colo.

[21] Appl. No.: 456,231

[22] Filed: May 31, 1995

[51] Int. Cl.$^6$ .......................... E21B 43/18; B01D 19/00
[52] U.S. Cl. ..................... 166/370; 405/128; 210/747
[58] Field of Search ................................ 166/370, 369, 166/372, 266, 268; 210/747, 749, 758; 405/128, 258

[56] References Cited

U.S. PATENT DOCUMENTS

| | | | |
|---|---|---|---|
| Re. 33,102 | 10/1889 | Visser et al. | 166/267 |
| 825,745 | 7/1906 | Mitchell . | |
| 1,286,666 | 12/1918 | Layne . | |
| 1,877,915 | 9/1932 | Lewis . | |
| 2,104,327 | 1/1938 | Kotzebue | 166/21 |
| 2,180,400 | 11/1949 | Coberly | 103/46 |
| 2,523,091 | 9/1950 | Bruce | 166/2 |

(List continued on next page.)

FOREIGN PATENT DOCUMENTS

3427532C1  8/1985  Germany .

OTHER PUBLICATIONS

In Situ Aeration of Groundwater: A Technology Overview–Oct. 16, & 17, 1990.
Proceedings of the NWWA/API Conference on Petroleum Hydrocarbons and Organic Chemicals in Ground Water—Prevention, Detection and Restoration—Nov. 13–15, 1985.
Fifth National Outdoor Action Conference on Aquifer Restoration, Ground Water Monitoring, and Geophysical Methods—May 13–16, 1991 (Ground Water Mgmt., Book 5 of the Series).
The Fifth National Symposium and Exposition on Aquifer Restoration and Ground Water Monitoring—May 21–24, 1985.
Haztech International '88—Hazardous Waste & Hazardous Materials Management—Sep. 20–22, 1988.
Vol. II, Proceedings of Petroleum Hydrocarbons and Organic Chemicals in Ground Water: Prevention, Detection and Restoration—Nov. 9–11, 1988.
Public Note (3 pp.).
Declaration Statement—Record of Decision; Rod Decision Summary (with attachments); and Responsive Summary, Upjohn Manufacturing Company, Superfund Site, Barceloneta, Puerto Rico.
Lexis Nexis—Environmental Protection Agency, Upjohn Manufacturing Company—Sep. 30, 1988.
Near Surface Geochemical Monirtoring of Underground Gas Storage Facilities —Apr. 1986.
SPL External Vapor Vending (Elimination) Program—Nov. 2, 1983.
Water Well Technology—Field Principals of Exploration Drilling and Development of Ground Water and Other Selected Minerals (4 page cover and pp. 240–308) (Michael D. Campbell and Jay H. Lehr).
Ground Water and Wells—A Reference Book for the Water-Well Industry—4th Printing 1975, Chapter 10, pp. 185–208 and Chapter 20, pp. 375–394.
Hydrogeologic and Geochemical Investigation, Mt. Olive Greens, Mt. Olive Township, N.J.—Nov., 1982.
A Monitoring and Removal Program for Leaked Propane Gas in the Vadose (Unsaturated) Zone: A Case Study (Thomas Lobasso, Jr. and Andrew J. Barber).

*Primary Examiner*—Stephen J. Novosad
*Attorney, Agent, or Firm*—Standley & Gilcrest

[57] ABSTRACT

A method and apparatus for removing volatile contaminants from the phreatic zone of contaminated ground. The apparatus is a system comprised of at least one air injection well and at least two pressure relief wells arranged in a line. Air is injected into the contaminated ground water to allow sparging of the volatile contaminants from a linear region between injection and relief wells. The volatile contaminants are captured by the injected air and carried to the extraction line for removal and treatment.

11 Claims, 1 Drawing Sheet

U.S. PATENT DOCUMENTS

| | | | |
|---|---|---|---|
| 2,635,696 | 4/1953 | Asketh | 166/1 |
| 2,765,850 | 10/1956 | Allen | 166/39 |
| 2,875,831 | 3/1959 | Martin et al. | 166/9 |
| 2,969,226 | 1/1961 | Huntington | 262/3 |
| 3,216,905 | 11/1965 | Baptist | 195/2 |
| 3,277,962 | 10/1966 | Flickinger et al. | 166/15 |
| 3,351,132 | 11/1967 | Dougan et al. | 166/11 |
| 3,547,190 | 12/1970 | Wilkerson | 166/75 |
| 3,649,533 | 3/1972 | Reijonen et al. | 210/50 |
| 3,653,438 | 4/1972 | Wagner | 166/266 |
| 3,665,716 | 5/1972 | Rogers et al. | 61/35 |
| 3,705,851 | 12/1972 | Brauer | 210/1 |
| 3,727,686 | 4/1973 | Prates et al. | 166/261 |
| 3,735,815 | 5/1973 | Myers | 166/313 |
| 3,765,483 | 10/1973 | Vencil | 166/265 |
| 3,796,883 | 3/1974 | Smith et al. | 250/260 |
| 3,823,777 | 7/1974 | Allen et al. | 166/266 |
| 3,828,525 | 8/1974 | Copa et al. | 55/68 |
| 3,846,290 | 11/1974 | Raymond | 210/11 |
| 3,980,138 | 9/1976 | Knopik | 166/314 |
| 3,990,513 | 11/1976 | Perch | 166/267 |
| 4,016,930 | 4/1977 | Arnold | 166/266 |
| 4,026,355 | 5/1977 | Johnson et al. | 166/246 |
| 4,126,556 | 11/1978 | Swanson et al. | 210/242 |
| 4,167,973 | 9/1979 | Forte et al. | 166/267 |
| 4,183,407 | 1/1980 | Knopik | 166/314 |
| 4,241,787 | 12/1980 | Price | 166/105 |
| 4,283,212 | 8/1981 | Graham et al. | 62/18 |
| 4,296,810 | 10/1981 | Price | 166/265 |
| 4,303,127 | 12/1981 | Freel et al. | 166/266 |
| 4,306,961 | 12/1981 | Taciuk | 208/11 R |
| 4,323,122 | 4/1982 | Knopik | 166/267 |
| 4,366,846 | 1/1983 | Curati, Jr. | 141/1 |
| 4,369,839 | 1/1983 | Freeman et al. | 166/53 |
| 4,401,569 | 8/1983 | Jhaveri et al. | 210/610 |
| 4,435,292 | 3/1984 | Kirk et al. | 210/747 |
| 4,442,901 | 4/1984 | Zison | 166/369 |
| 4,469,176 | 9/1983 | Zison et al. | 166/250 |
| 4,518,399 | 5/1985 | Croskell et al. | 55/16 |
| 4,544,381 | 10/1985 | Schmidt | 55/89 |
| 4,588,506 | 5/1986 | Raymond et al. | 210/606 |
| 4,593,760 | 6/1986 | Visser et al. | 166/267 |
| 4,660,639 | 4/1987 | Visser et al. | 166/267 |
| 4,662,900 | 5/1987 | Ottengraf | 55/90 |
| 4,723,968 | 2/1988 | Schippert et al. | 55/80 |
| 4,730,672 | 3/1988 | Payne | 166/266 |
| 4,738,206 | 4/1988 | Noland | 110/346 |
| 4,745,850 | 5/1988 | Bastian et al. | 98/56 |
| 4,765,902 | 8/1988 | Ely et al. | 210/610 |
| 4,782,625 | 11/1988 | Gerken et al. | 47/1.42 |
| 4,799,878 | 1/1989 | Schaeffer | 431/202 |
| 4,806,148 | 2/1989 | Ottengraf | 55/223 |
| 4,832,122 | 5/1989 | Corey et al. | 166/266 |
| 4,842,448 | 6/1989 | Koerner et al. | 405/258 |
| 4,846,134 | 7/1989 | Perry et al. | 123/520 |
| 4,848,460 | 7/1989 | Johnson, Jr. et al. | 166/245 |
| 4,850,745 | 7/1989 | Hater et al. | 405/258 |
| 4,864,942 | 9/1989 | Fochtman et al. | 110/226 |
| 4,872,994 | 10/1989 | Jakob | 210/691 |
| 4,886,119 | 12/1989 | Bernhardt et al. | 166/267 |
| 4,890,673 | 1/1990 | Payne | 166/266 |
| 4,895,085 | 1/1990 | Chips | 110/346 |
| 4,919,570 | 4/1990 | Payne | 405/128 |
| 4,945,988 | 8/1990 | Payne et al. | 166/266 |
| 4,951,417 | 8/1990 | Gerken et al. | 47/1.42 |
| 4,982,788 | 1/1991 | Donnelly | 166/266 |
| 5,076,727 | 12/1991 | Johnson et al. | 405/128 |
| 5,080,793 | 1/1992 | Urlings | 210/603 |
| 5,180,503 | 1/1993 | Gorelick et al. | 210/758 |
| 5,220,958 | 6/1993 | Bernhardt | 166/370 X |
| 5,277,815 | 1/1994 | Beeman | 210/605 |

METHOD AND SYSTEM TO ACHIEVE TWO DIMENSIONAL AIR SPARGING

BACKGROUND AND SUMMARY OF THE INVENTION

This invention relates to a method and apparatus for removing volatile contaminants from the phreatic zone, also known as the zone of saturation, that is, ground water.

Contamination of the phreatic zone with potentially hazardous materials is a common problem facing industry, the government and the general public. Frequently, as a result of spills, leakage from storage facilities or surface discharges, contaminants percolate into ground water, thereby posing a health threat to drinking water supplies. While groundwater is not as susceptible to pollution as surface water, once polluted, its restoration is difficult and long term. Various methods for withdrawing and treating contaminated groundwater have met with limited success. Typically, groundwater is removed from the phreatic zone, treated and then returned to the phreatic zone. This method involves great expense.

One previous attempt at solving these problems involved a closed-loop device which included one or more contaminant withdrawal wells surrounded by multiple air injection wells connected by a conduit. This device utilized the principle of sparging. Sparging is the process of forcing air through water to remove undesirable volatile organic contaminants (VOC's). The above described device formed air channels within the phreatic zone that were distributed in three-dimensions. This approach may lead to uncontrolled distribution of contaminants.

The method and apparatus of the present invention utilizes the principles of controlled two-dimensional sparging. The method involves installing one or more air injection wells and pressure relief wells in the phreatic zone. The pressure relief wells are porous within the phreatic zone but impermeable above the phreatic zone. Air is forced into the air injection well through the phreatic zone towards the pressure relief wells. The arrangement creates an air and water mixture in the phreatic zone and the pressure relief wells, where the volatile contaminants are stripped from the phreatic water, removed and/or treated along with the injected air. As the contaminated phreatic water moves through the arrangement of air injection wells and pressure relief wells by natural flow the phreatic water is cleansed of volatile contaminants.

When operation of the present invention is initiated, the injected air spreads in all directions, in a three-dimensional manner, from the injection well. Additionally, the water pressure at the base of the pressure relief wells is significantly higher than it is at the top of the water table within the relief wells. However, once the injected air reaches the pressure relief wells and forms an air/water mixture within the pressure relief well, the density of the water column within the relief wells drops significantly. As the density of the water column within the pressure relief wells starts to decline, the pressure at the base of the pressure relief well decreases significantly. This causes the air in the phreatic zone to tend toward the relief wells much more readily than on initial startup, because the air seeks to move in the direction of lower pressure area offered by the pressure relief wells. Therefore, the injected air tends to travel more directly towards the pressure relief wells, rather than in all directions.

If the injection well and the pressure relief wells are ganged in a line, the resultant air channels would be formed in two directions (thus, in a two-dimensional single plane) from the injection well to each of the relief wells. Thereby, approximating a two-dimensional sparging region, rather than a three-dimensional region. This arrangement may be utilized especially well when the ground water moves perpendicularly across the air path.

The present invention obviates the need for a pump at each relief well to assist the contaminated gas in escaping from each pressure relief well for treatment or storage. The air/water mixture achieved in each relief well rises above the water table and forces the contaminated air to exit the relief well at the ground surface. The contaminated air may then be collected, and may be treated and/or returned into the injection well if desired.

Objects and advantages of the present invention will be readily apparent upon a reading of the following description.

DETAILED DESCRIPTION OF PREFERRED EMBODIMENTS

The preferred method and apparatus herein described are not intended to be exhaustive or to limit the invention to the precise forms disclosed. They are chosen and described to explain the principles of the invention, and the application of the method to practical uses, so that others skilled in the art may practice the invention.

Figure 1:
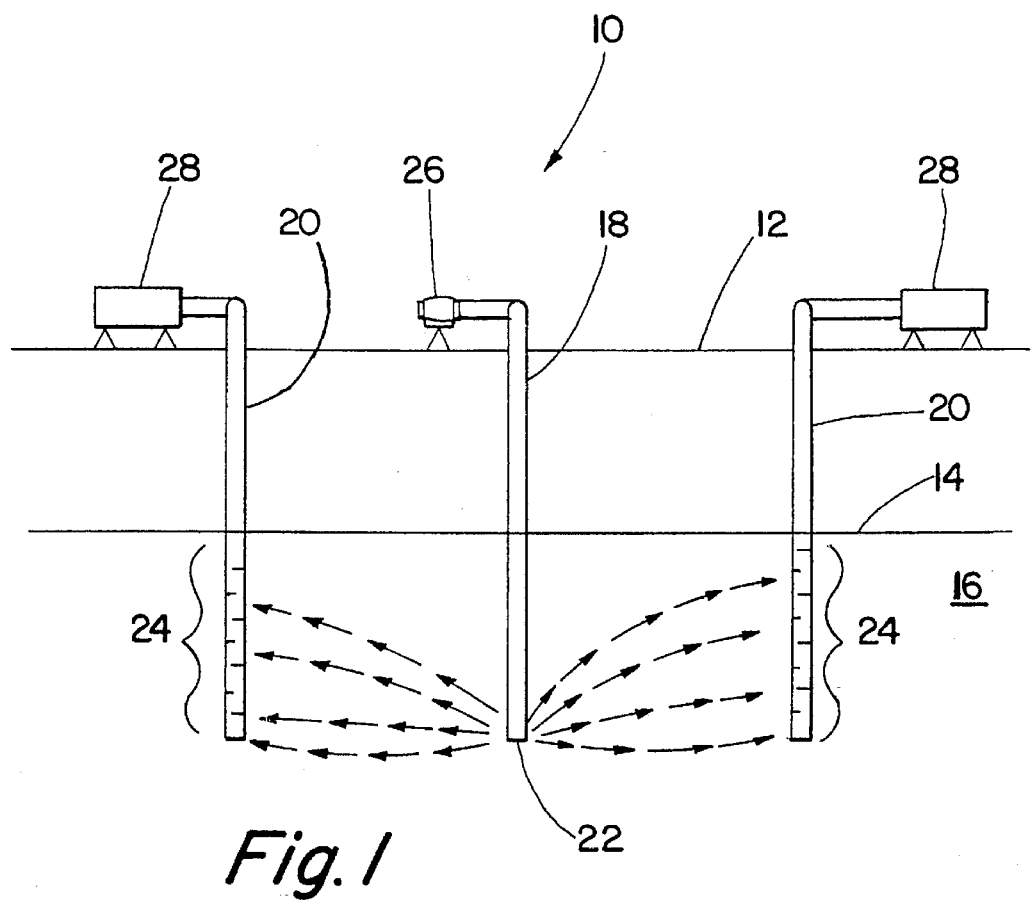
FIG. 1 shows a cross-sectional view of a preferred embodiment of the present invention.

FIG. 1 shows a cross-sectional view of the present invention at 10. Preferably, at least three boreholes are dug from the ground surface 12 to below the water table 14 and into the contaminated phreatic zone 16. An air injection well 18 is placed in a centralized borehole and pressure relief wells are placed in opposing wells 20. Air injection well 18 has an opening below the water table 14 at 22. Pressure relief wells 20 have fluid-permeable sections below the water table at 24.

Figure 2:
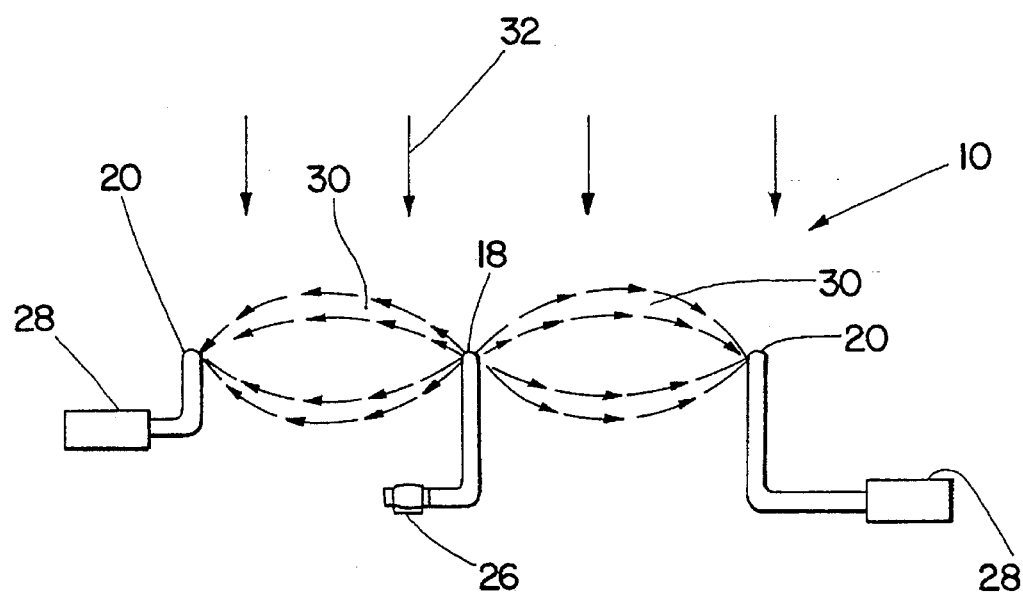
FIG. 2 shows a plan view of a preferred embodiment of the present invention in a steady-state operating condition.

The operation of the present invention may be understood with reference to both FIG. 1 and FIG. 2. Air pump 26 provides air under pressure to air injection line 18 where it escapes into the surrounding contaminated phreatic zone at 22. The air entrains volatile contaminants in solution with the ground water and carries them into the pressure relief wells 20 through the fluid-permeable sections at 24. The air/contaminated gas mixture may then be vented to the atmosphere or may be captured for treatment and/or storage as is shown at 28.

It may be appreciated that upon initial operation of the present invention the injected air pervades the phreatic zone in all directions (in a three-dimensional manner) from the injection well. Once the injected air reaches a pressure relief well it mixes with the water column within the relief well and causes the density of the water column to drop. This relieves pressure from the bottom of the relief well and creates a pressure gradient between the phreatic zone surrounding the relief well and the underground entrance to the relief well. This pressure gradient encourages the air in the phreatic zone to migrate toward the relief well. In a steady-state condition the path of underground air flow is no longer in all directions from the injection well but is biased towards the relief wells as shown by the broken line arrows 30 in FIG. 2. This arrangement is advantageous as it allows strategic placement of the wells with respect to the direction of the ground water flow as shown by solid arrows 32 in FIG. 2.

As ground water 32 flows across the air travel 30, it is naturally stripped of contaminants by mixing with the air molecules and migrating to the relief wells 20. This mostly natural process is aided by the arrangement of the wells to create the air flow "filter" as described.

As in FIG. 1, the air/contaminated gas mixture can be captured for treatment and/or storage at 28, or it can be vented to the atmosphere. Separate vacuums 28 may be connected to each relief well, as shown, for applying a vacuum to the relief well effective to induce a flow of air and a gas containing vapor of the contaminant present in the phreatic water out of the well.

The scope of the invention is not to be considered limited by the above disclosure, and modifications are possible without departing tom the spirit of the invention as evidenced by the following claims.

What is claimed is:

1. A process for removing volatile contaminants in a two-dimensional configuration from a contaminated area of the earth, wherein the contaminated area of the earth has a phreatic zone, the contaminant being present in the phreatic zone, the process comprising the steps off:

establishing a first borehole in said earth, said first borehole terminating in said phreatic zone;

establishing a second borehole spaced from said first borehole in said earth and which terminates in said phreatic zone;

positioning a first conduit in said first borehole;

positioning a second conduit in said second borehole;

applying air under pressure to said first conduit effective to induce a flow of air from said first conduit into said phreatic zone; and applying a vacuum to said second conduit effective to induce a flow of air and a gas containing vapor of said contaminant present in said phreatic water out of said second conduit, wherein said air flow through said phreatic zone is substantially perpendicular to the natural flow of said phreatic water.

2. The process of claim 1 wherein said first conduit is formed of impermeable tubing having an upper opening and a lower opening.

3. The process of claim 1 wherein said second conduit has an upper impermeable portion and a lower permeable portion.

4. The process of claim 1 wherein both the vacuum and the pressurized air are supplied by an air pump in fluid communication with both said first conduit and said second conduit.

5. The process of claim 1 wherein the volatile contaminants removed from said second conduit is neutralized.

6. The process of claim 1 further comprising the steps of delineating the extent of the contaminated area and locating said first borehole and said second borehole downstream of said contaminated area.

7. A system for removing volatile contaminants from the phreatic zone of a contaminated ground area, which comprises:

a first borehole terminating in said phreatic zone;

a first conduit disposed within said first borehole;

a second borehole spaced apart from said first borehole and terminating in said phreatic zone;

a second conduit disposed within said second borehole;

a blower operatively connected to said first conduit wherein said first conduit is in fluid flow communication with said blower; and a vacuum operatively connected to said second conduit wherein said second conduit is in fluid flow communication with said vacuum.

8. The apparatus of claim 7 wherein said first conduit is formed of impermeable tubing having an upper opening and a lower opening.

9. The apparatus of claim 7 wherein said second conduit has an upper impermeable portion and a lower permeable portion.

10. The apparatus of claim 7 wherein both the vacuum and the pressurized air is supplied by an air pump in fluid communication with both said first conduit and said second conduit.

11. A system for removing volatile contaminants from the phreatic zone of a contaminated ground area, which comprises:

a first borehole extending below the water table of said phreatic zone;

a tube disposed within said first borehole, said tube having an upper opening above the ground surface and a lower opening below the water table of said phreatic zone;

a second borehole spaced apart from said first borehole, said second borehole extending below the water table of said phreatic zone;

a first conduit disposed within said second borehole, said first conduit having an upper impermeable portion, a lower permeable portion, and an opening on the upper extent of said first conduit, wherein said upper impermeable portion extends from said ground surface to said water table, wherein said lower permeable portion extends below said water table to the lower extent of said conduit, wherein said opening of said upper extent is above said ground surface;

a third borehole space apart from said first borehole and opposite said second borehole, said third borehole extending below the water table of said phreatic zone;

a second conduit disposed within said third borehole, said second conduit having an upper impermeable portion, a lower permeable portion, and an opening on the upper extent of said second conduit, wherein said upper impermeable portion extends from said ground surface to said water table, wherein said lower permeable portion extends below said water table to the lower extent of said conduit, wherein said opening of said upper extent is above said ground surface;

a blower operatively connected to said upper opening of said tube, wherein said tube is in fluid flow communication with said blower;

a first vacuum operatively connected to said first conduit, wherein said first vacuum is in fluid flow communication with said opening of said first conduit; and a second vacuum operatively connected to said second conduit, wherein said second vacuum is in fluid flow communication with said opening of said second conduit.

\* \* \* \* \*

UNITED STATES PATENT AND TRADEMARK OFFICE
CERTIFICATE OF CORRECTION

PATENT NO. : 5,588,490

DATED : December 31, 1996

INVENTOR(S) : Suthersan, et al.

It is certified that error appears in the above-indentified patent and that said Letters Patent is hereby corrected as shown below:

In column 3, line 19, please delete the word "tom" and replace it with --from--.

In column 3, line 26, please delete the word "off" and replace it with --of--.

Signed and Sealed this

Twenty-second Day of April, 1997

*Attest:*

BRUCE LEHMAN

*Attesting Officer*

*Commissioner of Patents and Trademarks*